(12) United States Patent
Schultheis et al.

(10) Patent No.: US 12,455,413 B2
(45) Date of Patent: Oct. 28, 2025

(54) FIBER-OPTIC LIGHT GUIDE WITH DEFORMED ENDS

(71) Applicant: SCHOTT AG, Mainz (DE)

(72) Inventors: Bernd Schultheis, Schwabenheim (DE); Martin Cramer, Wiesbaden (DE); Jonas Grimm, Bad Schwalbach (DE); Fabian Brey, Frankfurt am Main (DE); Jonas Knaus, Mainz (DE); Lothar Willmes, Oestrich-Winkel (DE); Sergei Kraus, Pfungstadt (DE)

(73) Assignee: SCHOTT AG, Mainz (DE)

( * ) Notice: Subject to any disclaimer, the term of this patent is extended or adjusted under 35 U.S.C. 154(b) by 303 days.

(21) Appl. No.: 18/180,317

(22) Filed: Mar. 8, 2023

(65) Prior Publication Data

US 2024/0302586 A1    Sep. 12, 2024

(51) Int. Cl.
*G02B 6/04* (2006.01)
*G02B 23/26* (2006.01)

(52) U.S. Cl.
CPC .............. *G02B 6/04* (2013.01); *G02B 23/26* (2013.01)

(58) Field of Classification Search
CPC . G02B 6/04; G02B 6/06; G02B 6/065; G02B 6/08
See application file for complete search history.

(56) References Cited

U.S. PATENT DOCUMENTS

| | | |
|---|---|---|
| 11,084,754 B2 | 8/2021 | Ritter |
| 2006/0045444 A1* | 3/2006 | Miller ................. C03C 25/1061 385/115 |
| 2015/0016140 A1 | 1/2015 | Weingaertner |

FOREIGN PATENT DOCUMENTS

| | | |
|---|---|---|
| DE | 3744367 | 8/1989 |
| DE | 19703515 | 9/1998 |
| DE | 19830335 | 1/1999 |
| DE | 10013482 | 12/2003 |

* cited by examiner

*Primary Examiner* — Chad H Smith
(74) *Attorney, Agent, or Firm* — Ruggiero McAllister & McMahon LLC (57) ABSTRACT

A fiber-optic light guide is provided. The light guide includes plurality of optical fibers and an enveloping material. The plurality of optical fibers define a flexible fiber bundle. The flexible fiber bundle has a first diameter and a length along a longitudinal axis. The enveloping material encloses the plurality of optical fibers at one end of the flexible fiber bundle and over at least a part of the length to define a rigid portion. The plurality of optical fibers in the rigid portion are fused with one another. The flexible fiber bundle has a modified or formed cross-sectional geometry in a region of the enveloping material.

22 Claims, 5 Drawing Sheets

FIBER-OPTIC LIGHT GUIDE WITH DEFORMED ENDS

BACKGROUND

1. Field of the Invention

The invention relates to a fiber-optic light guide, containing a plurality of optical fibers which are combined or combinable as a flexible fiber bundle with a substantially constant diameter $d_1$ and which are enclosed all round by an enveloping material at at least one end of the fiber-optic light guide, at least over partial regions of its length, and the optical fibers are fused with one another there and preferably also with the enveloping material and form a rigid portion.

2. Description of Related Art

A main field of application for fiber-optic light guides are for example light guides for endoscopes, especially for medical or else industrial applications. Here, there is the need for the light guide firstly to be coupled to a light source at a first end (proximal end) or the end face thereof and secondly to be inserted into the body to be examined with a second end (distal end), in particular in order to guide light to that location or to receive light from there. In general, light sources with a high light output are desired. A larger entrance surface and hence diameter of the light guide makes efficient coupling to a light source better or easier but an insertion into the body to be examined becomes more difficult as the diameter increases. It is for this reason that some endoscopic light guides have a plurality of partial regions and for example comprise a first partial region with a largely constant greater diameter $d_1$ which is generally adjoined by a further partial region made of a conical tapering region consisting of an additional light guide, in which the diameter of the light guide reduces to a smaller diameter $d_2$. A further light guide with the smaller diameter $d_2$, which is introducible into the body or article to be examined, can then as a further partial region be connected to the tapering region.

In some embodiments of such endoscopes, further components, for example for image guidance or image recording, for example cameras or camera chips, and light sources may also be comprised, in particular at the distal end of the said endoscopes. A suitable illumination should be ensured in this case by means of the fiber-optic lighting, in particular for image recording purposes. This can be achieved by the arrangement at or around such further components and/or by an adapted geometry of the light guides.

In the previously known manner of production, the tapering region is generated by forming a separate fiber bundle into a cone and subsequently connecting the latter to the light guide with a constant diameter, for example by fusing. This creates an interface between light guide and tapering region, at which the fiber structure of the entire light guide is interrupted and at which light guided or conducted through the light guide is lost as a result of a partial reflection during the operating state, with the result that the overall transmission of the light guide is reduced.

Further, light guides are usually present as incoherent fiber bundles, in which the optical fibers consist of core-cladding fibers. Core-cladding fibers are fibers consisting of a light-guiding core which, along the fiber axis, is enclosed all round by a cladding made of a material with a lower refractive index than that of the material of the core. Light guidance in the fiber core is made possible by total-internal reflection at the interface between core and cladding. As a result of attaching the separate tapering region, it is not possible to ensure that a fiber core from the light-guide region with the constant diameter is connected to a fiber core from the tapering region. Instead, a statistical distribution of fibers input coupling into the fiber cladding and fibers at least partially input coupling into the core arises at the interface between the first partial region and the tapering region. However, since the light cannot be conducted in the fiber cladding, or the conduction therein is significantly poorer, this also leads to a reduction in the overall transmission of the light guide.

DE 100 13 482 C2 describes a method for producing a fiber-optic light guide which comprises a bundle of light-guiding fibres, which is collapsed in a glass sleeve at a suitable temperature prior to the introduction in a holder, with the glass sleeve being removed following the collapse of the fibers and before the introduction of the fibers into the holder of the bundle of fibres, with an intermediate layer furthermore being introduced between the bundle of fibers and a glass sleeve prior to the collapse in order to enable an improved removal of the glass sleeve from the bundle of fibers following the collapse. In this case, the method provides for a layer of a powdery, fine-grain or pasty separation means to be introduced as an intermediate layer, the melting point of which is above the softening temperature of the fibers and the glass sleeve, with the inner side of the glass sleeve being at least sectionally roughened prior to the introduction of the intermediate layer.

DE 197 03 515 C1 describes a fiber-optic light guide which consists of a fiber bundle, which is introducible into a given holder at at least one of its ends and which experiences optically active machining. In the process, provision is made for the end that is introducible into the given holder to be collapsed in a glass sleeve prior to its introduction and for the glass sleeve to be removed prior to the introduction of the end into the given holder.

In both cases, the glass sleeve is applied on a temporary basis and is removed by way of in part complicated methods following the machining and prior to the installation of the ends, in particular, into a ferrule or holder or sleeve.

SUMMARY

The applicant has developed a light guide and a method for the production thereof, in which the glass sleeve remains on the fiber bundle, in particular also following the tapering of the cross section, and, as a firm assembly, contributes to the stabilization of the fiber-optic light guide, that is to say the light guide has a rigid embodiment in the region of the enveloping material. Damage during further processing, for example damage to the outer edge of the optical fibres, especially also when removing the glass sleeve, can consequently be precluded.

Using this approach, it is possible in particular to present circular cross sections at in particular a tapered end face or end portion with a taper.

In view of relatively recent demands, for example in the case of specific endoscopes taking account of available installation space at the distal end of an endoscope, it is an object of the invention to provide a light guide or to realize geometries which deviate from a purely conical, substantially uniform tapering of the light guide, that is to say for example with a substantially unchanging cross-sectional geometry, which light guide also has non-circular end faces in addition to round end faces and also comprises, in addition to a consequently rigid, shaped region, a dedicated, flexible region continuously adjoining the rigid region without interruption.

A fiber-optic light guide is provided, which has a flexible region of length 11 with a substantially constant diameter $d_1$ at its original end face, comprises a further region with an enveloping material, wherein, in the region of the enveloping material, the fiber-optic light guide which is then subsequently rigid there is bent, twisted or angled away from its longitudinal axis, for example under the action of pressure and temperature, that is to say for example with at least one bend in at least one partial region of the region with enveloping material, and/or is formed in this rigid region in respect of its cross section or its cross-sectional geometry. This renders fiber-optic 3-D-deformed light guides realizable which, in particular, can be installed in endoscopes in which the available installation space is generally limited, or in which collisions with other components of the endoscope should be avoided.

In other words, this makes available a fiber-optic light guide which has a flexible region, at the end face of which a light source is connected or connectable or assignable thereto. In the region of the light guide surrounded by the enveloping material, which region is consequently rigid, the said light guide has at least one bend or deflection away from its original longitudinal axis or from the direction of this longitudinal axis. Thus, the fiber-optic light guide is deformed, in particular bent or angled once at least in the rigid region, and/or the fiber-optic light guide has at least one region with a modified or formed cross-sectional geometry in this rigid region. Thus, for example, the cross-sectional geometry of the fiber-optic light guide has been transformed or formed from an initially originally round shape into a non-circular shape, for example an oval or else polygonal shape. The region of the fiber-optic light guide which is consequently rigid, bent and/or formed in terms of its cross-sectional geometry generally forms the distal end of the light guide, which lies opposite to the proximal end and from which the light input coupled at the proximal end in the operating state is output coupled and made available. The deformation away from the longitudinal axis is therefore also understood to mean, in particular, bending or angling and the forming of the cross-sectional geometry is understood to mean precisely the geometric change thereof or the change in the cross-sectional shape.

In this case, the longitudinal axis or original longitudinal axis is considered to be the axis which is specified or specifiable by the region which is surrounded by an enveloping material and which is consequently rigid, this being prior to the said region being present in the form that is bent or angled at least once.

A variant provides for a fiber-optic light guide which has a flexible region of length 11 with a substantially constant diameter $d_1$ at its original end face and at least one tapering region of length 12, which adjoins the said original end face and in which the diameter of the light guide reduces from the diameter $d_1$ to the diameter $d_2$. In this case, the tapering region is enclosed all round by the enveloping material, at least over partial regions of the said tapering region's length, and the fiber structure continues without interruption from the region with the substantially constant diameter to the tapering region, with the tapering region having a tapered end face in which the optical fibers are fused with one another and preferably also with the enveloping material. In this case, the length 12 may also comprise a region which, adjoining the actual taper, initially extends, that is to say before a further deformation, bend or angling in particular, with an unchanging cross section or diameter $d_2$ and cross-sectional geometry. Additionally, the fiber-optic light guide, in the region of the enveloping material, can be bent away from its longitudinal axis and/or formed in respect of its cross-sectional geometry, in particular also in the region of the length 12, under the action of pressure and temperature.

Expressed differently, this provides a fiber-optic light guide which has a flexible region, at the end face (proximal end) of which the latter is connected or connectable or assignable to a light source, and which comprises in its region which is surrounded by enveloping material, and which is consequently rigid, a tapering region of length 12, in which the original diameter $d_1$ has tapered to a diameter $d_2$ and which has at least one bend or angling away from its original longitudinal axis or away from the direction of this longitudinal axis. Thus, the fiber-optic light guide is shaped; bent or angled once at least in the rigid region, and/or the fiber-optic light guide has at least one region with a modified, formed cross-sectional geometry in this rigid region. Thus, for example, the cross-sectional geometry of the fiber-optic light guide has been transformed from an initially originally round shape into a non-circular shape, for example an oval or else polygonal shape.

The region of the fiber-optic light guide which is consequently rigid, tapered, bent and/or formed in terms of its cross-sectional geometry generally forms the distal end of the light guide, which lies opposite to the proximal end and from which the light input coupled at the proximal end in the operating state is output coupled and made available.

In this case, the longitudinal axis or original longitudinal axis is considered to be the axis which is specified or specifiable by the region which is surrounded by an enveloping material and which is consequently rigid, this being prior to the said region being present in the form that is bent or angled at least once.

Firstly, this allows the light to be concentrated in the near field, that is to say in a small distance between the light-emergence surface of the light guide and the object (e.g., tissue surface).

Secondly, this increases the acceptance angle in the case of fiber-optic components and hence also the possible emission angle in the case of tapering of such components (or in the case of tapering). This effect becomes ever more pronounced the greater the difference between the diameters $d_1$ and $d_2$. What is decisive here is the conservation of what is known as the étendue, which characterizes the maximum transferred or transferable radiation. This conserved quantity describes the geometric capability of an optical system to pass light. Its value arises from the product of aperture size of the optical system and the transilluminated solid angle. In the case of fiber-optic light guides, the numerical aperture or the acceptance angle at which light can still be guided in the light guide, in particular, is decisive for a possible solid angle.

In simplified fashion, these circumstances can be described by the following relationship:

$$NA_1 * D_1 + NA_2 * D_2 \tag{1}$$

$$NA_1 = \sin(\alpha_1) \tag{2a}$$

$$NA_2 = \sin(\alpha_2) \tag{2b}$$

with the original fiber diameter $D_1$, the tapered fiber diameter $D_2$, the numerical aperture $NA_1$ of the original fiber and the numerical aperture $NA_2$ of the tapered fibre, where $\alpha_1$ and $\alpha_2$ are the acceptance angles for the numerical apertures $NA_1$ and $NA_2$, respectively. Consequently, it is possible to obtain a widening of the acceptance angle and hence a broader illumination. This is advantageous, especially if wide-angle camera modules are installed in an endoscope. For example, using an optical fiber which has an NA of 0.68 (corresponding to a double acceptance angle of approximately 85°, it is possible to achieve an NA broadening to approximately 0.79, corresponding to a broadening of half the acceptance angle from 42.5° to approximately 52.2° or 104.4° as double acceptance, by way of a reduction of the fiber diameter from for example $D_1$=70 μm to approximately $D_2$=60 μm, corresponding to a tapering of the diameter of the light guide from the diameter $d_1$ to the diameter $d_2$ of, for example, 4 mm ($d_1$) to approximately 3.4 mm ($d_2$). Hence, it is possible to adapt the emission behaviour of the light guide to the field of view of a camera, for example.

At this point, attention is drawn to the fact that the taper, that is to say the ratio of $D_1/D_2$ in relation to the diameters of the optical fibers or $d_1/d_2$ in relation to the fiber bundle cannot be arbitrarily large in order to obtain the above-described effect of beam expansion. Thus, in the case of optical fibers with an initial NA of 0.57 for example, corresponding to a double acceptance angle of approximately 70°, it is only possible to obtain a ratio $D_1/D_2$ or $d_1/d_2$ of slightly more than 1.75. In the case of another optical fiber with higher initial NA, for example NA=0.68, corresponding to a double acceptance angle of approximately 85°, it is possible to obtain a maximum taper ratio of 1.47. Furthermore, it is also necessary to take account of the fact that when the optical fibers taper, the cladding thickness of the optical fibers also reduces accordingly, with the result that, in the case of wall thicknesses of the order of 1-times to 2-times the maximum light wavelength to be transmitted (e.g., a maximum of 1 μm), the total-internal reflection in the transition region of core to cladding is lost as a consequence of quantum mechanical effects and the light guide emits light to the side in uncontrolled fashion, and hence loses its light-guiding properties. Advantageous taper ratios are therefore in the range of up to at most 1.5 to at most 1.7, depending on the NA of the light-guiding fibers.

In a preferred embodiment variant, provision can be made for the cross-sectional area of the end face of the light guide or the tapered end face of the tapered light guide to have been deformed or formed in substantially non-circular fashion, for example oval, D-shaped, reniform or else polygonal fashion. Using this, it is possible for example to realize a light-emergence surface arranged around a generally square camera chip, in particular at the distal end, in order to ensure homogeneous illumination at the distal end of an endoscope. Targeted forming of the distal end face from the circular form per se thus allows the available overall diameter at the distal end of an endoscope to be optimally exploited. This is furthermore applicable if moreover work channels are also provided in or on the endoscope, for example in order to insert or arrange minimally invasive instruments therein and in order to use the said instruments.

Plastic optical fibers (POF) or else quartz-based optical fibers can be used in some embodiments. It is particularly advantageous if the optical fibers are core-cladding fibers made of glass, in particular multi-component glasses, and the enveloping material consists of a glass and is designed in the form of a glass sleeve, the coefficient of thermal expansion of which differs by no more than 50%, preferably by no more than 30% from the coefficient of thermal expansion of the core glass of the optical fibers. Not only does this approach have very good optical properties but also offers advantages vis-à-vis plastic fibers or quartz fibers during the processing and subsequent handling.

With regard to a reduction of stray light which may emerge from the light guide, especially to the side thereof, that is to say laterally, in the operating state, that is to say when light is input coupled into the light guide, it has been found to be advantageous in further embodiments if the enveloping material comprises or consists of a colored glass or stained glass, in particular brown or black glass, and/or comprises or consists of a glass with a light-absorbent coating. Such stained glasses can be obtained by way of suitable colored glasses, in particular brown glass or black glass. Alternatively, colorless glasses per se can be stained, at least at treated surfaces, in what is known as a staining process using silver nitrate solutions for example, which process may be temperature assisted. Accordingly, such glasses are subsequently stainable. As an alternative or in addition, the enveloping material may also comprise a light-absorbent coating or may comprise a light-absorbently coated glass or may consist thereof. The enveloping material of the fiber-optic light guide thus comprises or consists of a colored glass, preferably black glass or brown glass, and/or comprises or consists of a stainable glass, in particular blackly or brownly stainable glass, and/or the enveloping material comprises or consists of a light-absorbently coated glass.

Here, attention is drawn to the fact that, in conjunction with plastic optical fibers (POF), the enveloping material preferably comprises or consists of a light-absorbing plastic sleeve, regardless of whether the latter is stained or coated in color.

Thus, in the operating state of an endoscope, for example, with light guides according to the invention, it is possible to reduce or minimize and optionally completely prevent stray light of the light input coupled into these light guides, which stray light emerges laterally from the light guide in particular. The materials which absorb light in this way should in this case be optionally adapted to the light to be applied, which light may be both in the visible (VIS) and in the infrared (IR) and/or ultraviolet (UV) wavelength range of the light spectrum. Thus, for example, it is possible to prevent or at least reduce crosstalk of stray light onto or into a camera installed in an endoscope, and it is consequently possible to improve the representation of the object to be examined.

Particularly preferably, optical fibers are made of a lead-free glass system for core and cladding. Such fibers are used very frequently in the field of medical engineering and are known, inter alia, from U.S. Pat. No. 11,034,612 B2 by the applicant. Depending on the variant of the fibre, which may be influenced by the core glass in combination with the optical cladding of the glass fiber in particular, the optical fibers may have a numerical aperture NA of at least 0.50, typically of the order of 0.57, preferably of at least 0.60, typically in the range of 0.64 to 0.68 and particularly preferably of at least 0.80, typically 0.86, with, as a matter of principle, a higher NA being advantageous for a higher transferable luminous flux. Moreover, a better illumination at the distal end of the light guide can be obtained, especially in the case of endoscopic applications.

For example, in the case of such fiber-optic light guides, the following geometries are representable depending on the diameters of the individual optical fibres:

For example, a typical diameter $d_1$ of the fiber bundle in the range from 0.5 mm to 3.0 mm, preferably in the range from 2.5 mm to 3.0 mm can be obtained in the case of a diameter of the optical fibers of (30±4) μm. In the case of thicker optical fibers with a diameter of (50±4) μm or (70±4) μm, the diameter $d_1$ can typically be in the range from 0.5 mm to 8.0 mm, preferably in the range from 2.5 mm to 6.5 mm. These are examples of typical fibers. In principle, it is also possible to process and apply fibers with larger or smaller diameters, which deviate from these examples, with the preferred fiber bundle diameters then shifting to rather larger and smaller ranges, respectively.

In the machined or processed state, that is to say in the possibly tapered region of the light guide comprised thereby, the thickness of the enveloping material is in the range from 0.1 mm to 0.5 mm, preferably in the range from 0.15 mm to 0.25 mm. A typical value is of the order of 0.2 mm, with the thickness tending to be slightly thicker for thinner fiber bundles than for larger fiber bundles.

It is particularly advantageous if the glass sleeve, which is formed as enveloping material, has a collar or an interior cone on the side facing the flexible part of the light guide with the optical fibres, as a result of which an insertion aid is provided for the optical fibers or the bundles thereof. This preferred embodiment is advantageous in that the optical fibers can be mounted, that is to say inserted, into the glass sleeve in tightly packed fashion with little outlay. It is already sufficient for this insertion aid to be manifested as such over only a few tenths of a millimetre.

In a further preferred embodiment, provision can be made for at least the deformed and/or tapered end of the fiber-optic light guide with the tapered end face on the tapering region and the other end with the original end face, which adjoins the region with the substantially constant diameter $d_1$, to be mounted in a respective end sleeve made of metal or plastic and a layer made of plastic to be situated at least sectionally between the fiber-optic light guide and the inner side of the end sleeves. This plastic is usually in the form of a potting compound or an adhesive. The respective end sleeves not only provide a mechanical protective function for the ends of the light guide but also a mechanical interface for the connection to a light source and/or to an instrument, and may for example comprise threaded screws, bayonet connectors or plug-in or latching connections.

A preferred use of the fiber-optic light guide as described above provides for utilization in a medical or industrial endoscope instrument and/or as a light guide between a light source and the endoscope instrument or an analysis device or as a light guide between a container and a detector unit. In particular, in conjunction with light sources that may contain halogen, LED and/or laser-based illuminants and on account of the particularly good optical transmission properties of the glass fibers of the applicant, it is possible to obtain a very high light output with a low color shift, that is to say falsification of the color transmission. By way of example, this may also be specified as a distinction of color temperatures. Moreover, advantages in terms of the overall light transmission efficiency can be obtained for lighting systems with a plurality of successively connected light-guiding components, as is the case, in particular, for endoscopes, regardless of whether these are designed to be reusable/reprocessable or as single use endoscopes. Further areas of application can be found in the fields of dentistry, surgery or, in medicine, dermatology, especially also in the field of robot-assisted medical examination methods or methods of surgery, which is also referred to as "robotic surgery". In this case, the overall length of the fiber-optic light guide can typically be up to 6 m, and up to 10 m and more in certain circumstances. In that case, the above-described glass fiber-based light guides in particular, which have a small color shift in the case of such application lengths, are advantageous.

The object relating to the method is achieved by virtue of the following method steps being comprised in the production of a fiber-optic light guide having a plurality of optical fibers which are combined as a flexible fiber bundle with a substantially constant diameter $d_1$: introducing the optical fibers as a fiber bundle into an enveloping tube which encloses the fiber bundle along a partial length, heating the fiber bundle located in the enveloping tube and the enveloping tube along at least a partial length of the enveloping tube, at least until the optical fibers and the enveloping tube soften, collapsing the enveloping tube onto the fiber bundle of the optical fibres, wherein the collapsing can be assisted by pressing and/or negative pressure, for example, with the result that a rigid region is formed, and deforming the light guide in the rigid region away from its longitudinal axis or away from the direction of the original longitudinal axis and/or forming the cross section or the cross-sectional geometry thereof.

Using these method steps, it is possible to realize different geometries in respect of an axial deformation of the light guide and also in respect of a cross-sectional geometry change along the axis of the light guide, with the cross-sectional area being constant in this case.

Expressed differently, a fiber-optic light guide is obtained in this way, the latter containing a plurality of optical fibers which are combined or combinable as a flexible fiber bundle with a substantially constant diameter $d_1$ and which are enclosed all round by an enveloping material at at least one end of the fiber-optic light guide, at least over partial regions of its length, as a result of which a rigid portion with a longitudinal axis (16) is formed. In this case, the optical fibers in the rigid portion are fused with one another and preferably also with the enveloping material, and the fiber-optic light guide is bent away from its longitudinal axis at least once in the region of the enveloping material and/or the cross-sectional geometry of the fiber-optic light guide is formed at least once in the region of the enveloping material.

With regard to an additional cross-sectional area change, a likewise preferred method variant provides for the following method steps to additionally be carried out following the heating of the fiber bundle located in the enveloping tube and of the enveloping tube: drawing the heated region until the fiber bundle located in the enveloping tube, in particular together with the enveloping material (20), has the diameter $d_2$, in at least a partial region, thus forming a tapering region in which the fiber structure is not interrupted, separating off the enveloping tube and the fiber bundle located therein at the location, or at a location, of the diameter $d_2$ in the tapering region.

This yields at least one light guide with a region which is enclosed by an enveloping material, and hence is a rigid region, the said region having a region with a diameter $d_1$ and a tapering region from $d_1$ to a diameter $d_2$, with the tapering region or the tapered region having a length 12.

This is followed by the above-described deformation process, with regard to at least one bend and/or at least one forming of, or change in, the cross-sectional geometry. Hence, it is also possible to realize a light guide that is shaped at one end thereof, the cross-sectional area of which light guide reducing towards the end. In further preferred embodiments, the deformation occurs in the region of length 12.

Hence, a fiber-optic light guide is present, with the fiber-optic light guide having a flexible region of length 11 with a substantially constant diameter $d_1$ at its original end face and at least one rigid tapering region of length 12, which adjoins the said original end face and in which the diameter of the light guide reduces from the diameter $d_1$ to the diameter $d_2$. In this case, the tapering region is enclosed by the enveloping material all round, at least over partial regions of its length, and the fiber structure continues without interruption from the region with the substantially constant diameter into the tapering region, with the tapering region having a tapered end face in which the optical fibers are fused with one another and preferably also with the enveloping material, and with the fiber-optic light guide being bent away from its longitudinal axis at least once in the region of the enveloping material and/or the cross-sectional geometry of the fiber-optic light guide being formed at least once in the region of the enveloping material.

In further embodiments, provision can be made within the scope of the above-described method steps for the utilized enveloping tube to already have a non-circular, in particular D-shaped cross section, and hence already be present as a non-circular tube per se, or for the tube to be deformed from its round cross section per se into its cross section that is non-circular, for example oval or substantially D-shaped, over its entire length, for example within the scope of an earlier process. Such a shaped or formed enveloping tube is advantageous in that a lower degree of forming of the light-guiding fibers can be obtained during the drawing, pressing, tapering, bending or forming of the light guide, which is advantageous in view of a reduction of the light losses. Moreover, advantages arise in respect of significantly denser fusing and during pressing. A further advantage arising vis-à-vis a round enveloping glass with deformed portions only at the end is that an enveloping tube that has been preformed over its entire length or a light guide based thereon can be installed more advantageously in the frequently only scant installation space in the endoscope.

In a further method variant, provision can additionally be made for the enveloping tube to be sealed on one side and for negative pressure to be applied to the enveloping tube and the optical fibers prior to the deformation or drawing of the heated region such that the optical fibers fuse with one another, and preferably also with the enveloping tube. This serves for the additional compression of the optical fibers such that these abut virtually ideally and air inclusions, so-called interstices, are largely avoided, preventing the ingress of bodily fluids in the case of in particular medical endoscopes, for example, or the ingress of cleaning fluids, for example during processing.

If the heated region is cooled in the process, prior to the separating off of the enveloping tube and the fiber bundle located therein, then the light guide can be ground and/or polished, for example at its end faces or at the tapered end face terminating the separated tapering region. As a result, a high optical quality of the fiber end faces can be obtained.

BRIEF DESCRIPTION OF THE DRAWINGS

The invention will be explained in more detail below on the basis of an exemplary embodiment illustrated in the figures. In detail.

DETAILED DESCRIPTION

Figure 1:
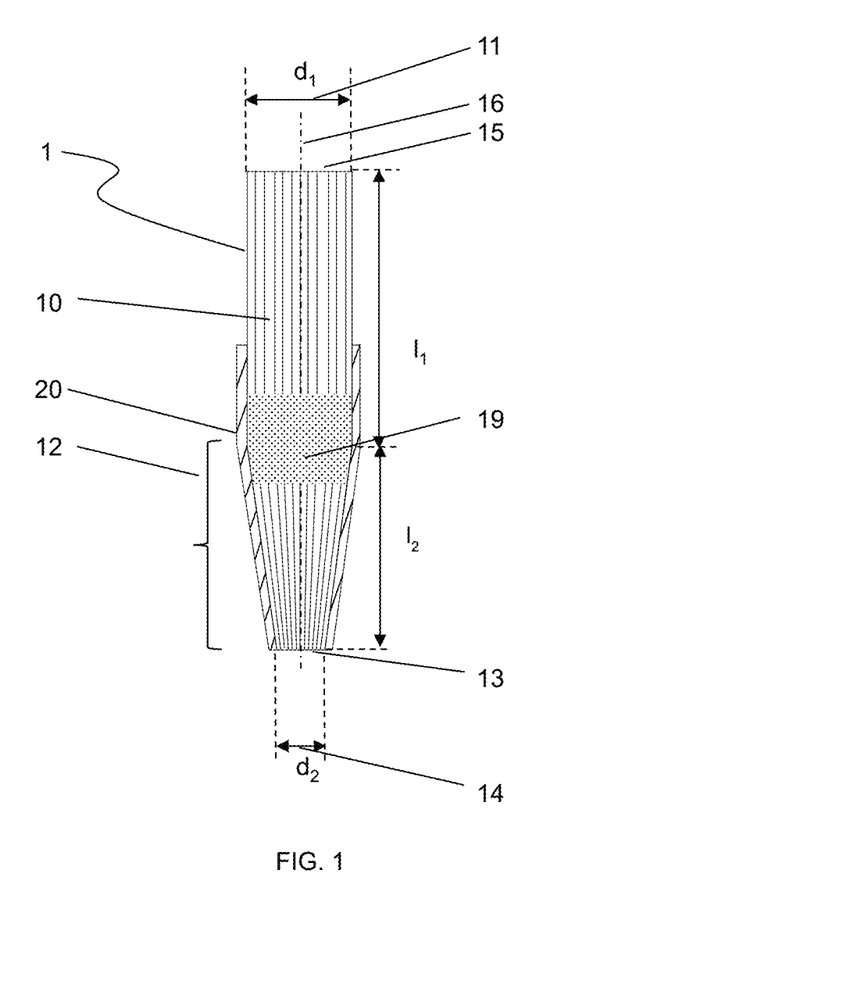
FIG. 1 schematically shows a tapered fiber-optic light guide.

FIG. 1 schematically shows the longitudinal section through a fiber-optic light guide 1. The latter consists of the optical fibers 10 which, without interruption in the fiber structure, continue along the longitudinal axis 16 from the region with the substantially constant diameter $d_1$ 11 and length $l_1$ into the tapering region 12, which has the length 12 and in which the diameter of the fiber-optic light guide 1 reduces from $d_1$ 11 to a diameter $d_2$ 14. The tapering region 12 is terminated by a tapered end face 13 while the region with the substantially constant diameter $d_1$ 11 is terminated by an original end face 15.

Along its external circumferential surface, the tapering region 12 is surrounded in full by an enveloping material 20. In accordance with the depicted embodiment, the enveloping material 20 also extends beyond the tapering region 12 into the region with the substantially constant diameter $d_1$ 11. As already described above, the enveloping material 20 preferably has a coefficient of thermal expansion which is matched to that of the material of the optical fiber 10. As likewise already described, the optical fibers 10 may be incoherent, meaning that the relative position of the individual optical fibers in the input matrix of the optical fibers at the original end face 15 does not correspond to the relative position of the optical fibers in the output matrix at the tapered end face 13. In the case of lighting applications like in endoscopy, this incoherent arrangement may even be intentional and targeted incoherence can be generated and used because particularly homogeneous brightness distributions can be obtained at the tapered end face 13, which is in the form of the light-emergence surface, as a result of the incoherence of the individual optical fibers 10. If light is input coupled into the original end face 15 and output coupled at the tapered end face 13 of the tapering region 12, the fiber-optic light guide 1 virtually acts as a light concentrator as a result of the cross-sectional change. Naturally, it is likewise possible to input couple the light at the tapered end face 13 and output couple the said light at the original end face 15. In this case, the longitudinal axis 16 is considered to be the axis which is specified or specifiable by the region which is surrounded by the enveloping material 20 and is consequently rigid; as may also be gathered from FIGS. 1, 3a-i, 4a and 5a. For simplification purposes, the flexible region is depicted following the longitudinal axis 16.

Likewise, it is possible according to the invention that the optical fibers 10 are arranged in such a way for the fiber-optic light guide 1 according to the invention that the relative position of an individual optical fiber 10 in the input matrix at the original end face 15 corresponds to the relative position of the optical fiber 10 in the output matrix at the tapered end face 13. In this case, they are referred to as coherent fiber bundles. These are able to transmit image information. If image information is input coupled at the larger original end face 15, the image can be received reduced in size at the smaller tapered end face 13. An enlargement of the image is obtained in the reverse input coupling direction.

As likewise already described above, the light guides 10 can be rigid or flexible. Hybrid solutions, in which partial regions are rigid and partial regions are flexible, are also possible. The region of the fiber-optic light guide 1 surrounded by the enveloping material 20 is generally rigid, with a transition region 19 forming in the region of the enveloping material 20, the flexible region of the optical fibers 10 transitioning into the rigid, fused region in the said transition region.

Figure 2:
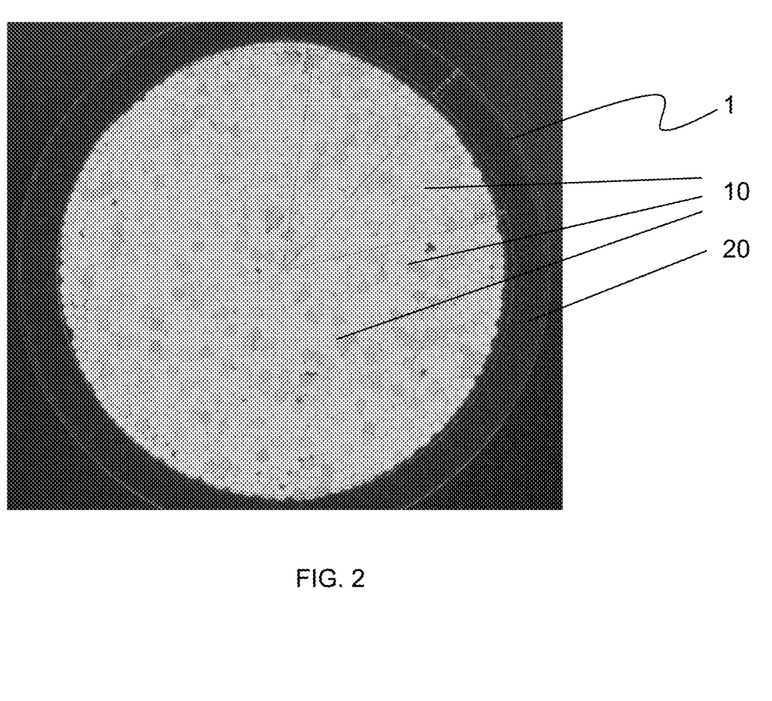
FIG. 2 shows a microscopic recording of the tapered end face of the light guide.

FIG. 2 represents a photographic recording of the tapered end face 13 at the end of the tapering region 12 of the fiber-optic light guide 1 according to the invention. It is apparent that the optical fibers 10 are enclosed by the enveloping material 20 in ring-shaped fashion at their joint outer circumferential surface, and the enveloping material 20 thus contributes to the stabilization of the optical fibers 10. Here, the optical fibers 10 are fused with one another. This was achieved by drawing the tapering region 12 under the application of negative pressure. As a result of the negative pressure, the optical fibers are pressed against one another and adopt the apparent substantially polygonal, in particular substantially hexagonal form. There preferably are no interstices any more between the fused optical fibers 10, and so no medium can ingress into the end face 13 any more. In particular, this has advantages in the case of medical applications of the light guide 1 according to the invention, as this renders the latter better autoclavable.

At the other end of the light guide 1, or in the part of the light guide 1 which is not or has not been formed so as to be enclosed by an enveloping material, provision is generally made for the optical fibers 10 to not necessarily be fused with one another and to therefore be considered to be a flexible fiber bundle. The optical fibers 10 still have a round cross section and there are interstices therebetween.

Usually, the light guide 1 is enclosed or mounted in corresponding end sleeves at its ends in order to connect the light guide 1, or render the said light guide connectable, to other objects such as for example further light guides and/or light sources and/or measuring equipment or endoscope instruments, etc. These end sleeves, which may consist of metal, for example stainless steel, or plastic, for example PPS, PPSU, PC, are shaped in the interior thereof so that they for example accommodate the tapered region of the light guide. As a rule, potting compounds, for example 1-component or 2-component adhesives, serve for fixation purposes.

In further embodiments, provision is advantageously made for at least the flexible part of the light guide 1, or the optical fibers 10 located therein, to be enveloped by a flexible envelope, for example a tube, fabric or mesh made of polymers or metals or a combination therefrom, for example as a wire helix tube. The envelope that is flexible in this way may also adjoin the end sleeves and/or the rigid part of the light guide 1 surrounded by an enveloping material 20, and/or at least partially envelop each of these. This flexible envelope may also comprise or consist of what is known as a shrink tubing material and/or may also be formed in multi-part fashion from different materials, which may also at least partially overlap.

According to the invention, provision can further be made for the fiber-optic light guide to not be tapered at its end but for the enveloping material 20 in the form of a glass sleeve to surround the optical fibers 10 for a further deformation of the one end of the light guide 1 and collapse on the bundle of the optical fibers 10 during the production process and press the optical fibers 10 in such a way that these have a substantially dense hexagonal packing, as shown in FIG. 2. Subsequently, a contour that deviates from the cylindrical form (forming of the cross-sectional geometry) and/or a targeted bending of the portion of the light guide 1, cylindrical up to this point, away from its original longitudinal axis 16 can be obtained by a further deformation step by means of a pressing tool 150 (see FIGS. 5*a* to 5*e*).

In this context, it should be observed that this deformation process can also be applied to previously conically tapered light guides 1 and a tapered and simultaneously deformed fiber-optic light guide 1 is obtained as a result.

FIGS. 3*a* to 3*i* show corresponding embodiments of a light guide 1 produced in this way. Depicted in each case are fiber-optic light guides 1 which consist of a bundle of optical fibers 10 and on the one end of which the light guide 1 has a deformation region 18, with the light guide 1 at the end having a region in which the said light guide is enclosed all round by the enveloping material 20 in the form of an enveloping tube, and the optical fibers 10 in the region of the enveloping material 20 are fused with one another and preferably also fused with the enveloping material 20 and form a rigid portion. In the process, a transition region 19 forms, in which the optical fibers 10 transition from a non-fused region, in which the fiber bundle is flexible or pliable, to the fused region, that is to say the rigid region towards the end of the light guide 1. Both this transition region 19 and the deformation region 18 are enclosed by the enveloping material 20 in full, and this ensures a sufficient mechanical stabilization of the transition region 19. By means of a forming process, as described in FIGS. 5*a* to 5*e*, it is possible according to the invention to bend the light guide 1 away from its longitudinal axis 16 and/or to form the said light guide in respect of its cross-sectional geometry, for example under the action of pressure and temperature.

Figures 3A, 3B, 3C:
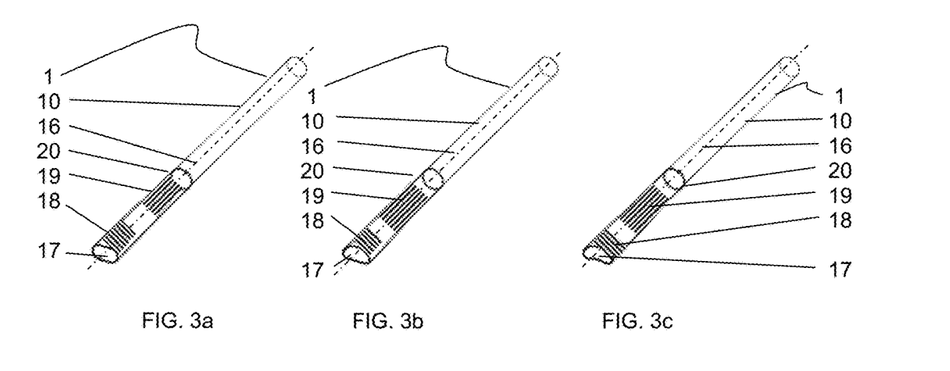
FIGS. 3a to 3i show schematic examples of a 3-D-deformed region of the light guide, FIGS. 4a to 4f schematically show the production process of the light guide with a round tapered end face of the light guide as a sequence, and FIGS. 5a to 5e schematically shows the forming process at the rigid end of the fiber-optic light guide.

FIGS. 3*a* to 3*c* show examples in which the light guide 1, in the case of a constant cross-sectional area along its longitudinal axis 16, is deformed at the end and has a deformed or formed end face 17 that deviates from the here circular form. By way of example, FIG. 3*a* shows a deformed or formed end face 17 with an oval geometry, or else flat pressing. FIG. 3*b* shows a deformed or formed end face 17 with a substantially D-shaped geometry and FIG. 3*c* shows a deformed or formed end face with a reniform geometry. Furthermore, substantially polygonal geometries are conceivable, especially square, rectangular, trapezoidal and triangular geometries. In principle, any desired geometries can be embodied, wherein, however, there are limits in respect of the embodiment of sharply formed edges or corners or, for example, tapering geometries, depending on the material of the optical fibers 10 of the light guide 1 on account of the temperature-dependent viscosity properties of the material during the deformation process. The embodied geometries therefore always have slight rounding in such regions and thus substantially correspond to the geometries to be obtained, or to the demanded or desired geometries.

Figure 3D:
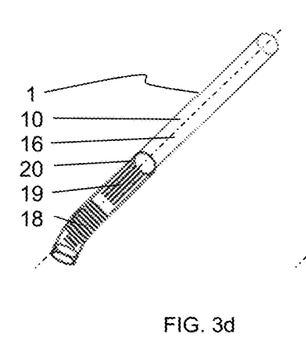
Figure 3E:
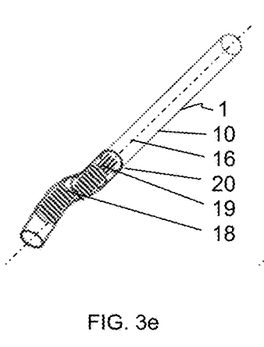

Furthermore, provision can be made for the light guide 1, in the case of a constant cross-sectional area along its original longitudinal axis 16, to be deformed away from this longitudinal axis 16. In other words, the light guide 1 is formed with at least one bent or angled section as a result. FIG. 3*d* shows an example in which the light guide was angled, that is to say has experienced bending, at the end. FIG. 3*e* shows an example in which the light guide has two bent regions.

Figure 3F:
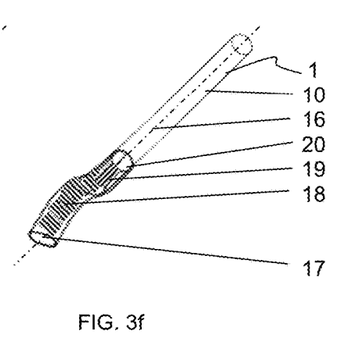

FIG. 3*f* depicts, in exemplary fashion, a light guide 1 which firstly has 2 bends in relation to its longitudinal axis 16 and secondly additionally has a deformed end face 17 at its end, in this case with an oval geometry.

Figure 3G:
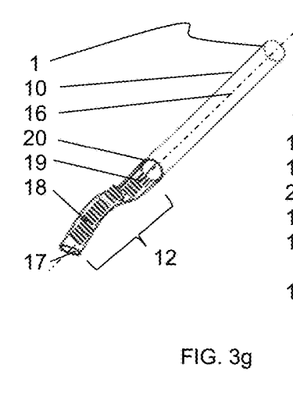
Figures 3H, 3I:
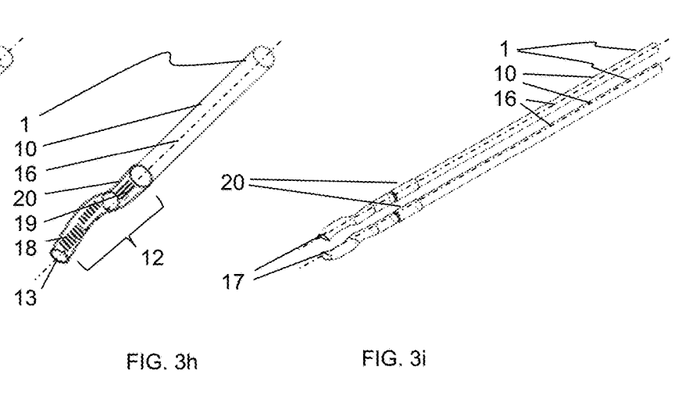

FIGS. 3*g* and 3*h* show examples of a deformed light guide 1, in which the cross section of the light guide is additionally tapered towards its deformed end in a tapering region 12. In addition to two bends away from the longitudinal axis 16, the light guide 1 shown in FIG. 3g additionally has an ovally deformed or formed end face 17. By contrast, the light guide shown in FIG. 3h merely has a tapered end face 13 with a still circular cross section.

By way of example, FIG. 3i depicts two light guides 1, each of which is deformed in a manner similar to the light guide 1 shown in FIG. 3g, that is to say they have a combination of bending and deformed end faces 17. In this case, the arrangement of the two light guides 1 is chosen so that between the light guides, for example installed in an endoscope instrument, it is possible to arrange work channels and/or electrical feed lines to a camera chip or a fiber-optic image guide between the deformed end faces 17 of the light guide according to the invention (not depicted in FIG. 3i). What can be achieved with the shown embodiment at the respective end of the respective light guide 1 is that the object to be examined, for example a tissue surface, can be illuminated without shadows.

Attention is drawn to the fact that the embodiments shown in FIGS. 3a to 3i merely represent examples. Any desired combination of cross-sectional change and deformation of the light guide 1 can be obtained. Thus, a cross section of the light guide 1 which is circular per se could also be pressed flat, for example, in only a certain region, as is shown schematically in the forming method in FIGS. 5a to 5e.

The method for producing a fiber-optic light guide 1, as described above, which fiber-optic light guide has a plurality of optical fibers 10 which are combined as a flexible fiber bundle with a substantially constant diameter $d_1$ 11, comprises the following main method steps: introducing the optical fibers 10 as a fiber bundle into an enveloping tube 21 which encloses the fiber bundle along a partial length, heating the fiber bundle located in the enveloping tube 21 and the enveloping tube 21 along at least a partial length of the enveloping tube, at least until the optical fibers 10 and the enveloping tube 21 soften, collapsing the enveloping tube 21 onto the fiber bundle of the optical fibers 10, for example as a result of negative pressure and/or the action of force, so that a rigid region is formed, in which rigid region the enveloping tube 21 and the optical fibers 10 are fused, at least in part, with the enveloping tube 21 and themselves, and the enveloping tube 21 forms the enveloping material 20, and deforming or bending the light guide 1 in the region of the enveloping tube 21 away from its longitudinal axis 16 and/or forming in respect of its cross-sectional geometry.

Figure 4A:
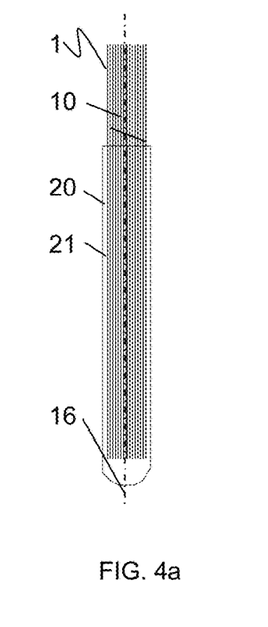

This applies if the cross-sectional area remains constant along the longitudinal axis 16 of the light guide 1 and is depicted schematically in FIGS. 4a and b, which are then followed by the forming process steps shown likewise schematically in FIGS. 5a to 5e.

Should tapering be additionally provided, within the scope of which the cross-sectional area reduces towards the end 13, the heating of the fiber bundles located in the enveloping tube 21 and of the enveloping tube 21 is followed by the implementation of the following method steps prior to the deformation process: drawing the heated region until the fiber bundle located in the enveloping tube 21 or the fiber bundle thus enclosed by the enveloping material 20, that is to say together with the enveloping material 20, has the diameter $d_2$ 14, in at least a partial region, thus forming a tapering region 12 in which the fiber structure is not interrupted, separating off the enveloping tube 21 and the fiber bundle located therein at the location of the diameter $d_2$ in the tapering region 12.

Figure 4B:
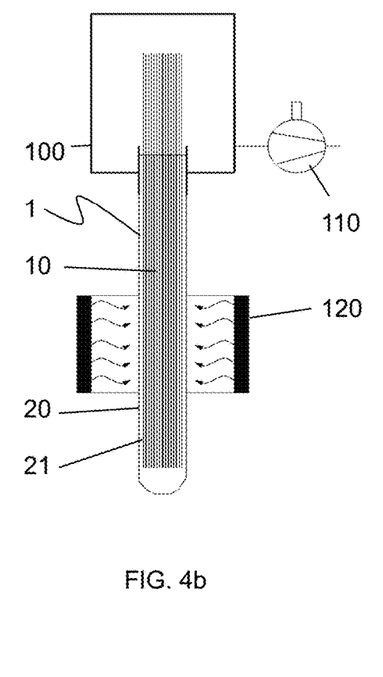
Figure 4C:
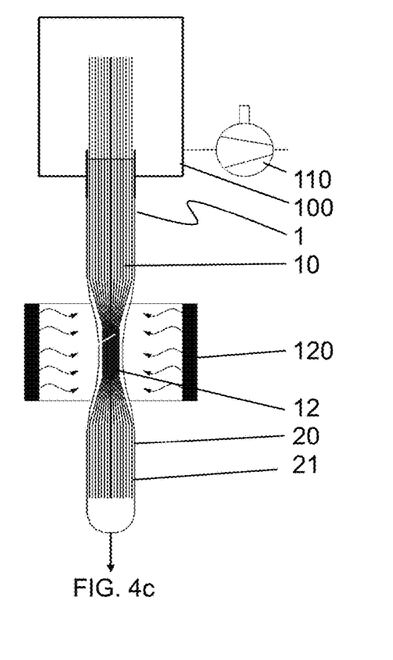
Figure 4D:
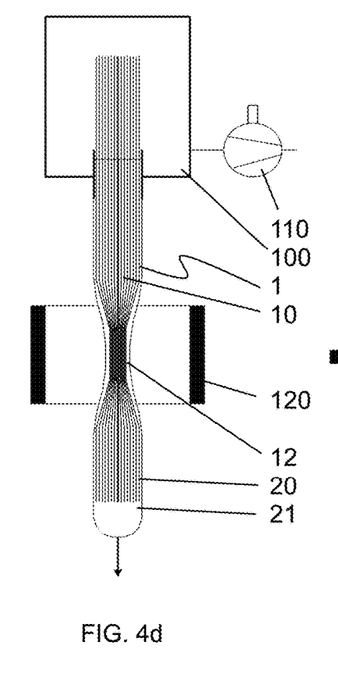
Figure 4E:
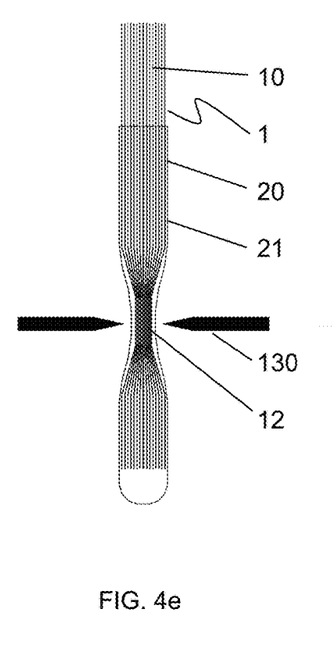
Figure 4F:
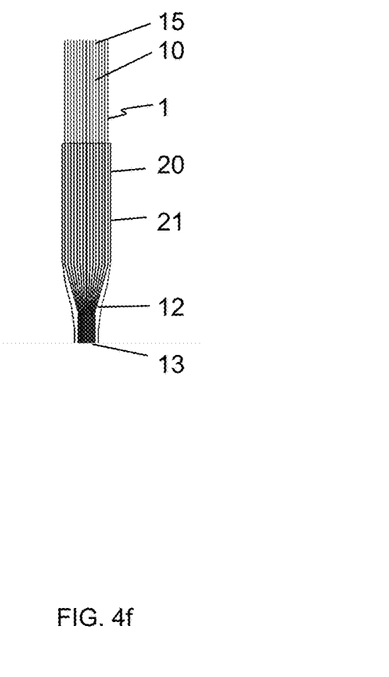
Figure 5A:
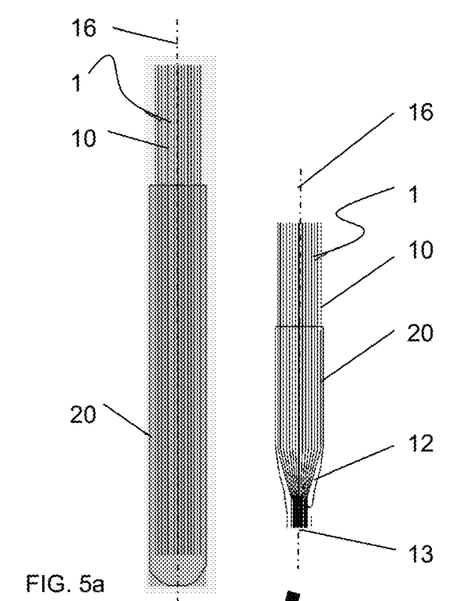
Figure 5B:
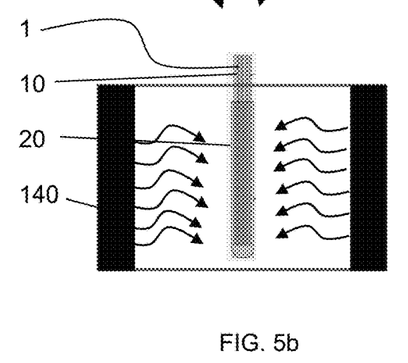
Figure 5C:
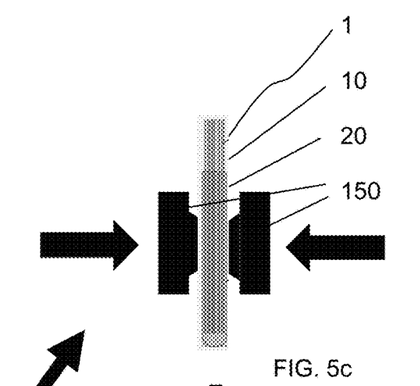
Figure 5D:
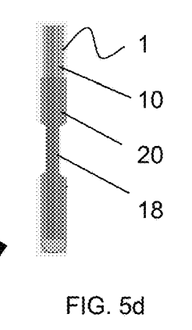
Figure 5E:
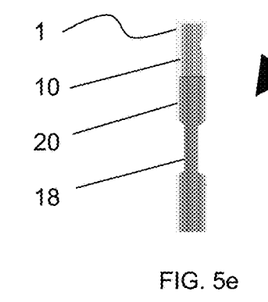

FIGS. 4a to 4f therefore schematically show the sequence of method steps for a light guide 1 including a tapering of the cross-sectional area, which are then followed by the forming process steps shown likewise schematically in FIGS. 5a to 5c.

FIG. 4a depicts the first method step, according to which the optical fibers 10 are introduced into the enveloping material 20, which is in the form of an enveloping tube 21, and thus form fiber bundle. An enveloping tube 21 which is closed to one side and was produced previously using known methods is used in FIG. 4a. Since the enveloping tube 21 remains on the light guide 1 according to the invention as the enveloping material 20 surrounding the tapering region 12, the material thereof is preferably selected in such a way that the coefficient of thermal expansion thereof is matched to that of the optical fibers 10. If core-cladding fibers are used, the coefficient of thermal expansion of the core material is considered for adaptation purposes since this usually makes up the main constituent of the individual core-cladding optical fibers 10. The optical fibers 10 themselves may have been produced previously in known drawing processes and cut to the required length. As a result, it is also possible to use standard optical fibers for the fiber-optic light guide 1 according to the invention.

FIG. 4b represents a further method step. In the process, the optical fibers 10 introduced into the enveloping tube 21 are surrounded by a negative pressure chamber 100 at their ends protruding from the enveloping tube 21, the negative pressure chamber being designed to be able to withstand the negative pressure to be applied. By way of example, this can be a metal tube. The connection between enveloping tube 21 and negative pressure chamber 100 is sealed by suitable measures such that air is unable to pass through the connection point, or at least not able to pass through to an extent where this becomes bothersome, when the air is pumped out of the volume formed by the negative pressure chamber 100 and the enveloping tube 21 by means of the pump 110. At least one heating device 120 is attached so that it is able to heat a partial region of the enveloping tube 21 and the optical fibers 10 introduced therein. By way of example, an electrical annular furnace can be used as heating device 120, but other devices such as burners or laser radiation and the like are also known to a person skilled in the art and able to be used. The heating device 120 and/or the device to which the enveloping tube 21 with the optical fibers 10 is attached or attachable may be designed to be displaceable such that the collapse and/or fusing of the enveloping tube to or with the optical fibers 10 also can be implemented over a desired length or at specific positions. As a rule, the closed-off end of the enveloping tube is separated off (not depicted here) and a fiber-optic light guide 1 with initially a substantially constant diameter $d_1$ 15 is thus obtained.

A light guide 1 with a tapering region 12 with a diameter $d_2$ 14 is obtained by the application of further method steps. In FIG. 4c, drawing of the tapering region 12 is depicted as a further method step. Once the enveloping tube 21 and the optical fibers 10 situated therein have been sufficiently warmed, the enveloping tube 21 is drawn along the axis of the optical fibers 10 by way of suitable, likewise known measures. As a result of the lengthening of the heated region caused thereby, the latter is constricted and the tapering region 12 is formed. The longer the drawing, the smaller the diameter of the drawn region. The length of the extraction can set the desired minimum diameter $d_2$ 14. If, as described above, negative pressure acts in the interior of the negative pressure chamber 100 and the enveloping tube 21, the pressure of the ambient medium, air pressure as a rule, exerts a force on the optical fibers 10 that is perpendicular to the fiber axis thereof and thus causes the optical fibers 10 to fuse with one another and with the inner wall of the enveloping tube 21 under pressure.

By way of suitable guidance of this process, for example by means of heating devices 120 that are variable in terms of their temperature profile and optionally have a plurality of heating zones or by means of one or more displaceable heating devices, it is possible to obtain a tapering region 12 which, following the actual tapering, also has a substantially unchanging diameter $d_2$.

The previously heated region is cooled in a further method step according to FIG. 4d. This can preferably be implemented in controlled fashion depending on the choice of materials for the optical fibers 10 and the enveloping tube 21, that is to say it is not simply the case that the heating device 120 is switched off but that the heating power of the latter is slowly reduced in order to prevent bursting or tearing of the previously heated region. Moreover, it is possible during the cooling to continue to exert a force in the direction of the extraction direction on the fiber-optic light guide 1 so that the latter does not contract excessively during the cooling procedure, which contraction could possibly lead to an unwanted change in the diameter $d_2$ 14 as a result.

In a further method step according to FIG. 4c, the heating device 120 and the negative pressure chamber 100 are removed and the drawn-out region is separated off at a suitable point using a suitable separation device 130. To this end, the point at which the drawn-out region has the desired diameter $d_2$ 14 is chosen, optionally plus tolerances required for the post-processing.

The result of the production process according to the invention, which is depicted in FIG. 4f, is the fiber-optic light guide 1 according to the invention, in which the optical fibers 10 continue into the tapering region 12 without an interruption in the fiber structure. The enveloping tube 21 or the co-drawn-out region thereof, as enveloping material 20, surrounds the tapering region 12 and stabilizes the latter. Accordingly, the enveloping tube 21 is apportioned at least a dual function, specifically on the one hand to combine the light guides 10 to form a fiber bundle for the production process and, on the other hand, as enveloping material 20 to protect the sensitive transition region 12 at the end of the fiber-optic light guide 1 in the end product. Optionally, the enveloping tube 21, provided it is sealed on the side distant from the flexible end, enables as a further function the rendering of negative pressure applicable during the drawing of the transition region 12 and thus enables further improved fusing of the optical fibers 10, preferably also with the enveloping tube 21, especially in the transition region 12.

In further embodiments, provision can be made within the scope of the above-described method steps for the enveloping tube 21 to already have a non-circular cross section and/or already have been deformed from its round cross section per se into a cross section that is non-circular, in particular oval or substantially D-shaped, within the scope of an earlier process. In such non-circular embodiments or in embodiments that are non-circular per se, the diameters d1 and/or d2 are understood to mean the respective maximum transverse dimension.

To produce a preferred embodiment of the fiber-optic light guide 1 according to the invention, for example between 2200 to 2500 fibres, flexible core-cladding optical fibers 10 made of glass with the diameter of 70 μm, are combined to form a fiber bundle with the diameter of 3.80 mm to 4.25 mm and the described method is used to produce a fiber-optic light guide 1 with a tapering region with the length $l_2$ of 15 to 20 mm, which likewise is surrounded by a glass as an enveloping material 20, the latter having substantially the same coefficient of thermal expansion as the core glass of the optical fibers 10. The diameter $d_2$ 14 of the fused optical fibers 10 in the tapered end face 13 of the tapering region 12 is 2.20 mm in this case. $L_1$ can be chosen as desired but is typically several tens of centimetres to several metres, but can also reach a length of 10 m or more. The end faces 13, 15 can usually be mounted in metal sleeves and the region between the metal sleeves can be surrounded by a flexible protective jacket made of plastic. The metal end sleeve at at the end of the tapering region 12 preferably has a cylindrical external geometry. However, since the tapering region 12 is substantially conical, this metal sleeve therefore preferably has a conical internal geometry matched thereto, with the result that it is possible to produce a substantially form-fitting connection between the external circumferential surface of the transition region 12 and the internal circumferential surface of the end sleeve. The invention likewise comprises a layer, for example a plastic layer, in particular for example an adhesive layer, situated between the outer circumferential surface of the transition region 12 and the inner circumferential surface of the end sleeve.

As a result of the uninterrupted fiber structure in the transition into the tapering region 12, the fiber-optic light guide 1 according to the invention has an improved transmission vis-à-vis the light guides known from the prior art. It is producible in cost-effective fashion and from standard optical fibers using the method according to the invention. This renders the production process thereof flexible and very different geometries and diameters $d_1$ of the conduction region and $d_2$ of the tapering region 12 can be produced efficiently according to requirements.

FIG. 5a to FIG. 5e schematically show how a deformation can be produced at the rigid end of the fiber-optic light guide 1, that is to say at the fixed end enclosed by the enveloping material 20 or enveloping tube 21.

The fiber-optic light guide 1 with its optical fibers 10 and the enveloping material 20 previously fused with the optical fibers 10, depicted in FIG. 5a to the left as a cylindrical shape with a constant cross-sectional area or depicted to the right with a tapered cross-sectional area, are heated by means of the heating device 140 (FIG. 5b) in such a way that the actual forming can occur in the next step (FIG. 5c). In this case, forming or deformation means, for example a pressing tool or forming tool 150, are used to press the desired contour into the fiber-optic light guide 1, that is to say the desired contour is generated, with the result that the fiber-optic light guide 1 has a forming region 18 according to FIG. 5d. This forming region may have various manifestations, as shown in FIGS. 3a to 3i in exemplary fashion.

In this case, it is possible or may be necessary for the deformations to be attached or applied successively in more than one deformation step, in particular also using different pressing or forming tools 150, especially in the case of desired or demanded complex embodiments. For example, it is possible to initially generate a bend away from its original longitudinal axis 16 at the rigid end of the light guide 1, and subsequently a further bend, in particular with a different alignment, followed by forming at the end face 13 or another cross-sectional region of the rigid region and/or bent end. This may also comprise a plurality of heating procedures, and corresponding deformation or forming processes, which are suitably implemented simultaneously (in parallel) and/or successively (sequentially).

Optionally, the excess part of the enveloping material 20 is separated off at the end of the light guide (FIG. 5e), especially if the enveloping material 20 was fused previously. This is usually followed by a grinding and polishing process for the end face or the tapered end face 13.

LIST OF REFERENCE SIGNS

| | |
|---|---|
| 1 | Fiber-optic light guide |
| 10 | Optical fibre |
| 11 | Diameter $d_1$ |
| 12 | Tapering region |
| 13 | Tapered end face |
| 14 | Diameter $d_2$ |
| 15 | Original end face |
| 16 | Longitudinal axis |
| 17 | Deformed end face |
| 18 | Deformation region |
| 19 | Transition region |
| 20 | Enveloping material |
| 21 | Enveloping tube |
| 100 | Negative pressure chamber |
| 110 | Pump |
| 120 | Heating device |
| 130 | Separation device |
| 140 | Heating device |
| 150 | Pressing tool |

What is claimed is:

1. A fiber-optic light guide, comprising:
a plurality of optical fibers defining a flexible fiber bundle, the flexible fiber bundle having a first diameter and a length along a longitudinal axis;
an enveloping material enclosing the plurality of optical fibers at one end of the flexible fiber bundle and over at least a part of the length to define a rigid portion,
wherein the enveloping material has a thickness in a range from 0.1 mm to 0.5 mm,
wherein the plurality of optical fibers in the rigid portion are fused with one another, and
wherein the flexible fiber bundle has a modified or formed cross-sectional geometry in a region of the enveloping material.

2. The fiber-optic light guide of claim 1, wherein the modified or formed cross-sectional geometry is a bend away from the longitudinal axis in the region having the enveloping material.

3. The fiber-optic light guide of claim 1, wherein the plurality of optical fibers in the rigid portion are fused with the enveloping material.

4. The fiber-optic light guide of claim 1, wherein the flexible fiber bundle further comprises a flexible region with the first diameter at an end face and a tapering region that adjoins the end face and reduces from the first diameter to a second diameter, the second diameter being reduced with respect to the first diameter,
wherein the enveloping material encloses the tapering region over at least a partial region of the tapering region, and
wherein the tapering region has a tapered end face in which the plurality of optical fibers are fused with one another.

5. The fiber-optic light guide of claim 4, wherein the plurality of optical fibers in the tapering region are fused with the enveloping material.

6. The fiber-optic light guide of claim 4, wherein the end face or the tapered end face has a cross-sectional area has a shape selected from a group consisting of non-circular, oval, D-shaped, reniform, and polygonal.

7. The fiber-optic light guide of claim 4, wherein the enveloping material comprises a material selected from a group consisting of colored glass, black glass, brown glass, stainable glass, blackly stainable glass, brownly stainable glass, coated glass, and glass coated with light-absorbent.

8. The fiber-optic light guide of claim 4, wherein the enveloping material is a glass sleeve having a collar or an interior cone on a side facing the flexible region.

9. The fiber-optic light guide of claim 5, further comprising a taper ratio of first and second diameters of the plurality of optical fibers to the first and second diameters of the fiber bundle up to 1.7.

10. The fiber-optic light guide of claim 1, wherein the plurality of fibers comprises fibers having a core made of glass and a cladding on the core, and
wherein the enveloping material comprises a second glass, the second glass having a coefficient of thermal expansion that differs by no more than 50% from a coefficient of thermal expansion of the glass of the core.

11. The fiber-optic light guide of claim 10, wherein the coefficient of thermal expansion of the second glass that differs by no more than 30% from the coefficient of thermal expansion of the glass of the core.

12. The fiber-optic light guide of claim 10, wherein the glass of the core and the second glass of the enveloping material comprise a Pb-free glass, and wherein the optical fibers have a numerical aperture of at least 0.50.

13. The fiber-optic light guide of claim 12, wherein the numerical aperture is at least 0.80.

14. The fiber-optic light guide of claim 1, wherein the first diameter is a range from 0.5 mm to 3.0 mm when the optical fibers have a third diameter of 30±4 µm.

15. The fiber-optic light guide of claim 1, wherein the first diameter is a range from 0.5 mm to 8.0 mm when the optical fibers have a third diameter of 50+4 µm.

16. The fiber-optic light guide of claim 1, further comprising an end sleeve comprising metal or plastic, the end face and/or the tapered end face are mounted in the end sleeve.

17. The fiber-optic light guide of claim 16, further comprising a layer of plastic at an inner side of the end sleeve.

18. The fiber-optic light guide of claim 1, wherein the fiber-optic light guide is configured for a use selected from a group consisting of a medical endoscope instrument, an industrial endoscope instrument, a light guide between a light source and an endoscope instrument, a light guide between a light source and an analysis device, and a light guide between a container and a detector unit.

19. The fiber-optic light guide of claim 1, wherein the plurality of optical fibers comprises plastic optical fibers (POF) and wherein the enveloping material comprises a light-absorbing plastic sleeve.

20. A method for producing a fiber-optic light guide, comprising:
introducing a plurality of optical fibers as a fiber bundle into an enveloping tube so as to enclose the fiber bundle along a partial length to define an enclosed structure, the enveloping material having a thickness in a range from 0.1 mm to 0.5 mm;
heating the fiber bundle and the enveloping tube of the enclosed structure until the optical fibers and the enveloping tube soften to define a softened structure;
collapsing the softened structure so that the enveloping tube collapses onto the fiber bundle to define a collapsed bundle having a longitudinal axis; and
deforming the collapsed bundle in a region of the enveloping tube, wherein the deforming comprises deforming the region away from the longitudinal axis and/or forming a cross-sectional geometry of the region.

21. The method of claim 20, further comprising:
drawing the softened structure until the fiber bundle located in the enveloping tube together with the enveloping material tapers to define a tapering region in which the bundle is not interrupted; and
separating the enveloping tube and the fiber bundle at the tapering region.

22. The method of claim 20, wherein the introducing step further comprises introducing the plurality of optical fibers as the fiber bundle into the enveloping tube so as to enclose one end of the flexible fiber bundle.

* * * * *